(12) United States Patent
Ledzius

(10) Patent No.: US 7,994,947 B1
(45) Date of Patent: Aug. 9, 2011

(54) METHOD AND APPARATUS FOR GENERATING A TARGET FREQUENCY HAVING AN OVER-SAMPLED DATA RATE USING A SYSTEM CLOCK HAVING A DIFFERENT FREQUENCY

(75) Inventor: Robert Charles Ledzius, Round Rock, TX (US)

(73) Assignee: Maxim Integrated Products, Inc., Sunnyvale, CA (US)

(*) Notice: Subject to any disclaimer, the term of this patent is extended or adjusted under 35 U.S.C. 154(b) by 83 days.

(21) Appl. No.: 12/479,529

(22) Filed: Jun. 5, 2009

Related U.S. Application Data

(60) Provisional application No. 61/196,734, filed on Jun. 6, 2008.

(51) Int. Cl.
*H03M 7/00* (2006.01)
(52) U.S. Cl. .......................... 341/61; 341/50
(58) Field of Classification Search ............... 341/61, 341/50, 51
See application file for complete search history.

(56) References Cited

U.S. PATENT DOCUMENTS

| 5,504,751 | A | 4/1996 | Ledzius et al. |
| 5,729,225 | A | 3/1998 | Ledzius |
| 5,761,074 | A * | 6/1998 | Nakamura ...................... 702/75 |
| 5,841,324 | A | 11/1998 | Williams |
| 6,256,395 | B1 | 7/2001 | Melanson |
| 6,490,329 | B2 * | 12/2002 | Nguyen et al. ................ 375/372 |
| 6,707,855 | B2 | 3/2004 | Patana |
| 6,720,834 | B2 | 4/2004 | McCarthy et al. |
| 6,727,763 | B2 | 4/2004 | Endo |
| 7,230,557 | B1 | 6/2007 | Burk et al. |
| 7,636,559 | B2 | 12/2009 | Magnusen et al. |
| 7,653,137 | B2 | 1/2010 | Fink et al. |
| 7,715,815 | B2 | 5/2010 | Gomez |
| 2002/0008588 | A1 | 1/2002 | Khan |
| 2003/0058054 | A1 | 3/2003 | Endo |
| 2003/0193373 | A1 | 10/2003 | McCarthy et al. |
| 2006/0209987 | A1 | 9/2006 | Miyagi et al. |
| 2010/0009645 | A1 | 1/2010 | Der et al. |

FOREIGN PATENT DOCUMENTS

EP  0782063 A1  2/1997

* cited by examiner

*Primary Examiner* — Jean B Jeanglaude
(74) *Attorney, Agent, or Firm* — Haverstock and Owens LLP

(57) ABSTRACT

Method and apparatus for generating a target frequency having an over-sampled data rate using a system clock having a different frequency are disclosed. In one aspect of the present disclosure, the circuit includes, a digital phase locked loop coupled to the system clock. The digital phase locked loop including an oscillator output and an oscillator input. The circuit further comprises an extra pulse eliminator coupled to the oscillator output. The extra pulse eliminator includes an extra pulse eliminator output. One or more frequency dividers may be coupled to an extra pulse eliminator output.

15 Claims, 7 Drawing Sheets

METHOD AND APPARATUS FOR GENERATING A TARGET FREQUENCY HAVING AN OVER-SAMPLED DATA RATE USING A SYSTEM CLOCK HAVING A DIFFERENT FREQUENCY

TECHNICAL FIELD

This disclosure relates generally to digital circuits, and, in particular, to a digital clock control circuit.

BACKGROUND

An audio codec is generally any combination of hardware and software components that converts audio signals between analog and digital domains for generation of digital audio content and playback of digital audio content, sometimes while compressing or decompressing digital audio data.

Digital audio content playback capabilities of portable devices have increasing demand. For example, cell phones, PDAs, mp3 players, laptop computers or other electronics gadgets are devices for which consumers seek digital audio playback functionalities. To operate audio codecs, a system clock that is a multiple of the audio data rate is often needed, although the master clock in a system can be unrelated to the audio data rate. Typical compressed digital audio bit rates can include, for example, 32, 96, 128, 160, 192, 224, 320 Kbits/s, or other intermediate values. However, digital content may be encoded at one of several standard data rates such as, 8 or 16 kHz (voice), 44.1 kHz (CD-ROM), or 48 kHz (High Fidelity) while operating with one of many different master clock rates such as 12 MHz (USB), 11.2896 (CD-ROM), 13 MHz (GSM phone), or other system clock frequencies.

Therefore, one typical solution employs analog phase locked loops (PLLs) to generate the clock rate utilized by the audio code or other parts of the system. Analog PLLs can be ideal solutions for audio codec applications when they can be implemented with lower jitter voltage controlled oscillators (VCOs). Digital PLLs have generally been undesirable for audio codec playback applications as clock jitter when processing audio signals is non-ideal and can limit, for example, dynamic performance and sound quality. However, an analog PLL based solution is oftentimes expensive and resource intensive (e.g., area and/or power consuming). The applicability of analog PLLs to implementing audio codecs in shrinking audio playback devices may be limited.

SUMMARY OF THE DESCRIPTION

Method and apparatus for generating a target frequency having an over-sample data rate using a system clock having a different frequency are described here. Some embodiments of the present disclosure are summarized in this section. Applying the method and apparatus to the clock control of audio converters results in a highly flexible audio codec capable of operating at any desired data rate using any available system clock frequency in either a master or slave mode of operation, even if operating asynchronously over a wide range of frequencies.

One aspect of the present disclosure includes a circuit for generating a target frequency from a system clock. In this aspect, the circuit has a digital phase locked loop coupled to the system clock. The digital phase locked loop comprises a digital numerical controlled oscillator having an oscillator output and an oscillator input and an extra pulse eliminator coupled to the oscillator output. The extra pulse eliminator has an extra pulse eliminator output, and/or one or more frequency dividers coupled to an extra pulse eliminator output.

In one embodiment, the digital numerical controlled oscillator includes a multi-bit integrator having a multi-bit numerical input and a single bit overflow output, when, in operation, the multi-bit integrator is clocked by the system clock. The multi-bit integrator comprises a multi-bit register coupled to an output of a multi-bit full adder further coupled to the multi-bit numerical input and register value. The multi-bit register is typically implemented using flip-flops.

One embodiment of the circuit further includes, an N-calculator coupled to the oscillator input. The N-calculator may include a one-shot edge detector having a detector output and a frequency counter coupled to the detector output. In this aspect, the frequency counter includes a counter output. The circuit may further include error calculator can be coupled to the counter output. The error calculator includes a calculator output, and/or a frequency index calculator coupled to the counter output. One embodiment of the frequency index calculator includes a calculator output that is coupled to an input of the digital numerical controlled oscillator.

In one embodiment, the one-shot edge detector includes, a latch that has an edge triggered latch output and a reset node. The embodiment includes a shift-register comprising at least a first flip-flop coupled in series with a second flip-flop. The second flip-flop may have an input node and an output node. One embodiment of the one shot-edge detector includes a logic gate with a first input coupled to the input node of the second flip-flop and a second input coupled to the output node of the second flip-flop to detect a rising edge. The logic gate output can be coupled to the reset node of the latch. In one embodiment, the logic gate is an AND gate with the second input of the AND-gate being inverted and the first flip-flop is coupled to the latch output. The circuit may further include, another flip-flop coupled in series between the latch and the first flip-flop. The additional flip-flop may be coupled to the latch output.

A further aspect of the present disclosure includes an audio codec. In one aspect, the audio codec includes a clock generation circuitry. In one embodiment, the clock generation circuitry includes a digital phase locked loop with a digital numerical controlled oscillator for creating clocks necessary for operating digital-to-analog (DAC) and analog-to-digital (ADC) signal paths that include interpolation and decimating filters. The ADC decimating filter path may selectively obtain its input from either an embedded ADC or from an externally supplied 1-bit data stream. The decimating filter may also obtain its input with a mixed combination of both types of input signals.

One embodiment includes, a one or more channel digital signal mixer having first mixer output nodes, coupled to the first filter input of the decimating comb filter. The mixer would include an adder.

One aspect of the codec ADC signal path includes a second one or more channel MUX with a first MUX input nodes allowing selective additional filtering following the first decimation filter to provide additional noise filtering in order to perform sample rate conversion when inputting a digital signal stream from an asynchronous source.

One embodiment includes a digital-to-analog interpolating filter and multiple 1-bit digital-to-analog converters and multiple internal digital-to-analog converters. In one embodiment, the audio codec further includes multiple analog low pass filters.

A further aspect of the present disclosure includes a method, which may be implemented on a system, of generating an internal clock signal from a system clock. One embodiment includes generating a left-right data rate clock in master mode by identifying the value of numerical driver signal based on a desired target frequency and the internal clock signal. The left-right clock signal may be highly-jittered by one or more system clock cycles, but utilized in a manner so dynamic range is not affected by the large amounts of jitter. In one embodiment, the fixed driver signal value is applied to the digital numerical controlled oscillator. The digital numerical controlled oscillator has an output that has a frequency directly proportional to the value of the input driver signal value. The output frequency is used to derive the desired over-sampled data rate internal clock signal. In one embodiment, dividing the internal clock frequency is frequency divided to generate one or more additional clock frequencies.

In one embodiment, the driver signal value is periodically automatically generated in a slave mode of operation. The driver signal generation may include detecting a rising edge of the left-right clock to indicate the time required to analyze the measured internal signal frequency. The measured internally generated clock signal is compared to the desired over-sampled rate to create a frequency differential value. The numerical driver signal value can be adjusted based on the frequency differential value. The driver signal may also be predetermined. For example, in a master mode of operation, the driver signal is generated based on user selected or user specified parameters.

The system clock is generally substantially within a range of 5 MHz and 25 MHz. The target frequency of the internal clock signal is generally substantially between 6 kHz to 52 kHz.

Other features of the present disclosure will be apparent from the accompanying drawings and from the detailed description which follows.

DETAILED DESCRIPTION

Figure 1A:
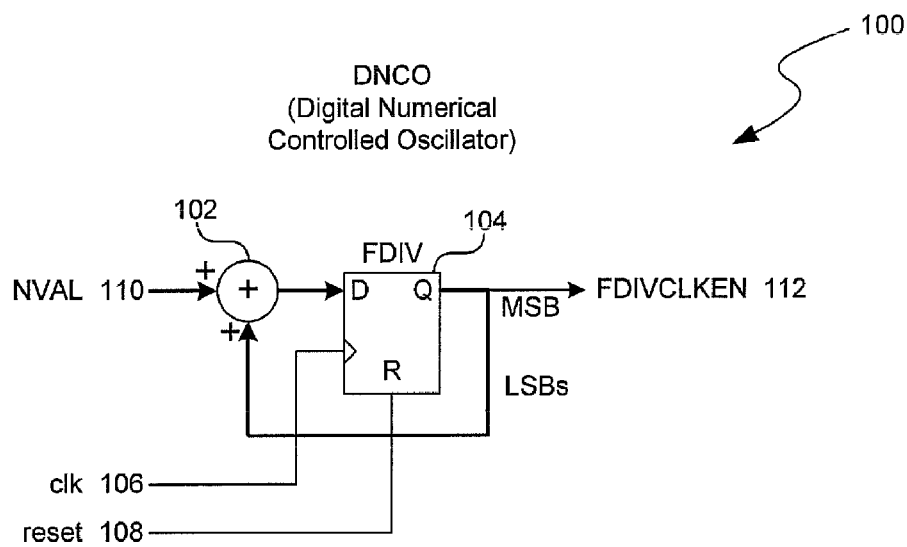
FIG. 1A is a block diagram of a digital numerical controlled oscillator (e.g., DNCO) for generating from a system clock, a signal that has on average a target frequency, according to one embodiment.

The following description and drawings are illustrative and are not to be construed as limiting. Numerous specific details are described to provide a thorough understanding of the disclosure. However, in certain instances, well-known or conventional details are not described in order to avoid obscuring the description.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

The terminology used in the description presented below is intended to be interpreted in its broadest reasonable manner, even though it is being used in conjunction with a detailed description of certain specific examples of the disclosure. Certain terms may even be emphasized below; however, any terminology intended to be interpreted in any restricted manner will be overtly and specifically defined as such in this Detailed Description section.

Embodiments of the present disclosure are related to methods and apparatuses for digitally generating a target frequency from a system clock having a different frequency.

This novel techniques described here include embodiments that implement a Digital PLL for a full duplex audio codec without degrading dynamic range of the audio signals being converted, even when the reference clock signal contains large amounts of digitally induced jitter. Any data rate can be used in either a master or slave mode of operation while operating the circuit using any master clock frequency within a wide operating frequency range The master clock can be but is not necessarily asynchronous. Additionally, the master clock can be related or un-related to the data rate. Therefore, maximum clock flexibility can be achieved while decreasing both circuit area and power consumption. This embodiment can operate with minimal lock times under a wide range of operating conditions and significant amounts of digital cycle induced jitter on the data clock input.

Although embodiments of the present disclosure are described with example reference to an audio codec, the application of the novel aspect of the techniques herein discussed is not limited as such. Applications of generating a signal with a predetermined frequency from a system clock to any system where there is a difference between the system clock frequency and a desired internal clock frequency, are contemplated and are considered to be within the scope of this disclosure.

FIG. 1A is a block diagram of a digital numerical controlled oscillator 100 (hereinafter referred to as "DNCO") for generating from a system clock (CLK 106), a signal that has on average a target frequency, according to one embodiment.

The digital numerical controlled oscillator 100 is used as part of a system to synchronize digital signals by generating a signal that is in sync with an input signal. DNCOs can be used within digital PLLs. Digital PLLs (hereinafter referred to as DPLLs) generally include a phase detector, a loop filter, an oscillator (DNCO), and in some instances, a divider. Although a particular circuit configuration for a DNCO is shown, any known and/or convenient DPLL can be utilized with the disclosed DNCO or any variations thereof without deviating from the novel art of the disclosure, including but not limited to, phase frequency detector DPLLs and/or quadrature DPLLs.

In one embodiment, the DNCO100 includes an integrator (e.g., multi-bit integrator). The integrator has a multi-bit numerical input (NVAL 110) and a single bit over flow output (FDIVCLKEN 112). The integrator includes a register 104 (e.g., multi-bit register) coupled to the output of a full adder 102 (e.g., multi-bit full adder). The integrator is clocked by the system clock at the clock input (CLK) 106 to the FDIV 104 at the clock frequency.

The full adder 102 includes an adder output and the multi-bit numerical input (NVAL 110). The register 104 is coupled to the adder output. The full adder 102 is further coupled to a register value FDIV 104. In one embodiment, the register 104 includes multiple flip-flops. A reset signal 108 may be applied to the register 104.

The most significant bit of the DNCO output, FDIVCLKEN 112, can be used to enable the system clock signal to generate a new signal as an internal clock signal that, on average, has a target frequency (the frequency of FDIVCLK). The FDIVCLKEN 112 represents the overflow carry output. The number of overflow carry output pulses in a fixed amount of time generally varies linearly with the driver signal (or, input N-value (NVAL) 110) to the DNCO. The NVAL 110 is generally selected based on the system clock (CLK), the over-sampled data rate (e.g., 192× the LRCLK data rate), and the desired target frequency of the generated internal clock signal.

The driver signal, NVAL 110 can be set based on the mode of operation. For example, in the slave mode of operation, the NVAL 110 is computed continually at the LRCLK rate via internal circuitry. In the master mode of operation, the NVAL 110 is supplied via external sources, for example, user specified or supplied by an audio codec. Example circuit configurations for generating NVAL in the slave mode of operation is illustrated with further reference to FIG. 2.

Figure 1B:
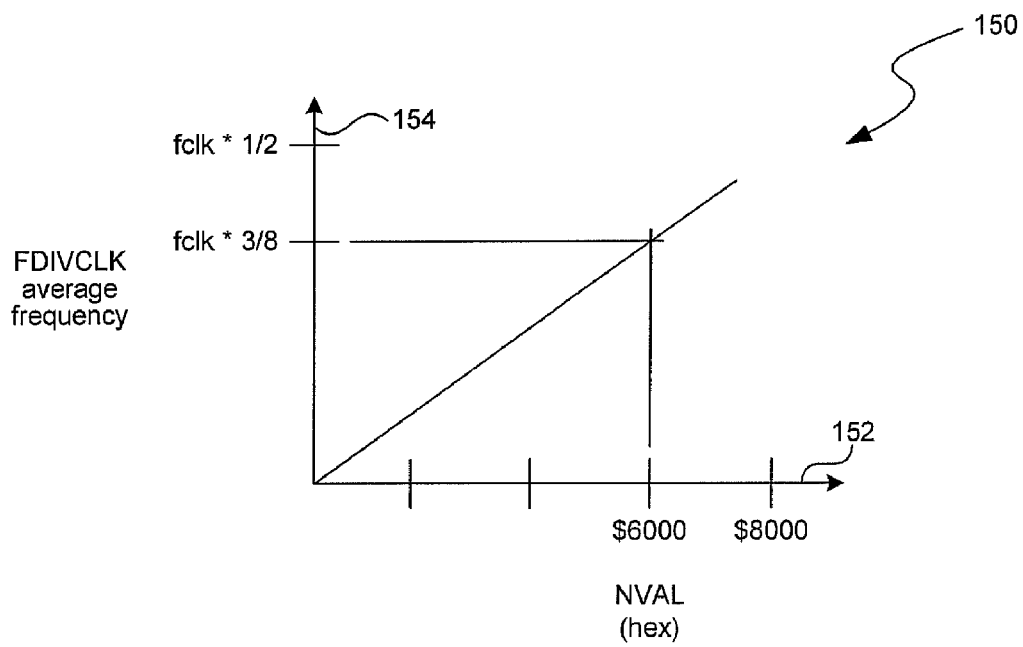
FIG. 1B illustrates a plot depicting the average DNCO frequency output variation with the DNCO input (NVAL), according to one embodiment.

FIG. 1B illustrates a plot 150 depicting the average DNCO frequency output variation with the DNCO input (NVAL), according to one embodiment.

The x-axis 152 of plot 150 depicts the hexadecimal representation of NVAL. The y-axis 154 represents the average frequency of FDIVCLK in terms of the system clock frequency ($f_{clk}$). Note that the accuracy of the FDIVCLK frequency is dependent upon the resolution reflected by the number of register bits of NVAL before it is rounded to the finite number of NVAL register bits. The frequency error can be reduced by adding more bits to the NVAL register. There is no frequency error when there is no truncation due to rounding.

As shown, the average frequency of FDIVCLK increases linearly with NVAL. The NVAL is based upon the DNCO resolution and the output clock multiple suitable per application. For example, assume a 15-bit NVAL resolution with a 16-bit register width (104 of FIG. 1A.) and a target frequency of FDIVCLK=192×LRCLK, NVAL can be computed as follows:

$$NVAL = 65536 \times 96 \times f_{LRCLK}/f_{CLK} = 2^{16} \times (192/2) \times f_{LRCLK}/f_{CLK}$$

Figure 2:
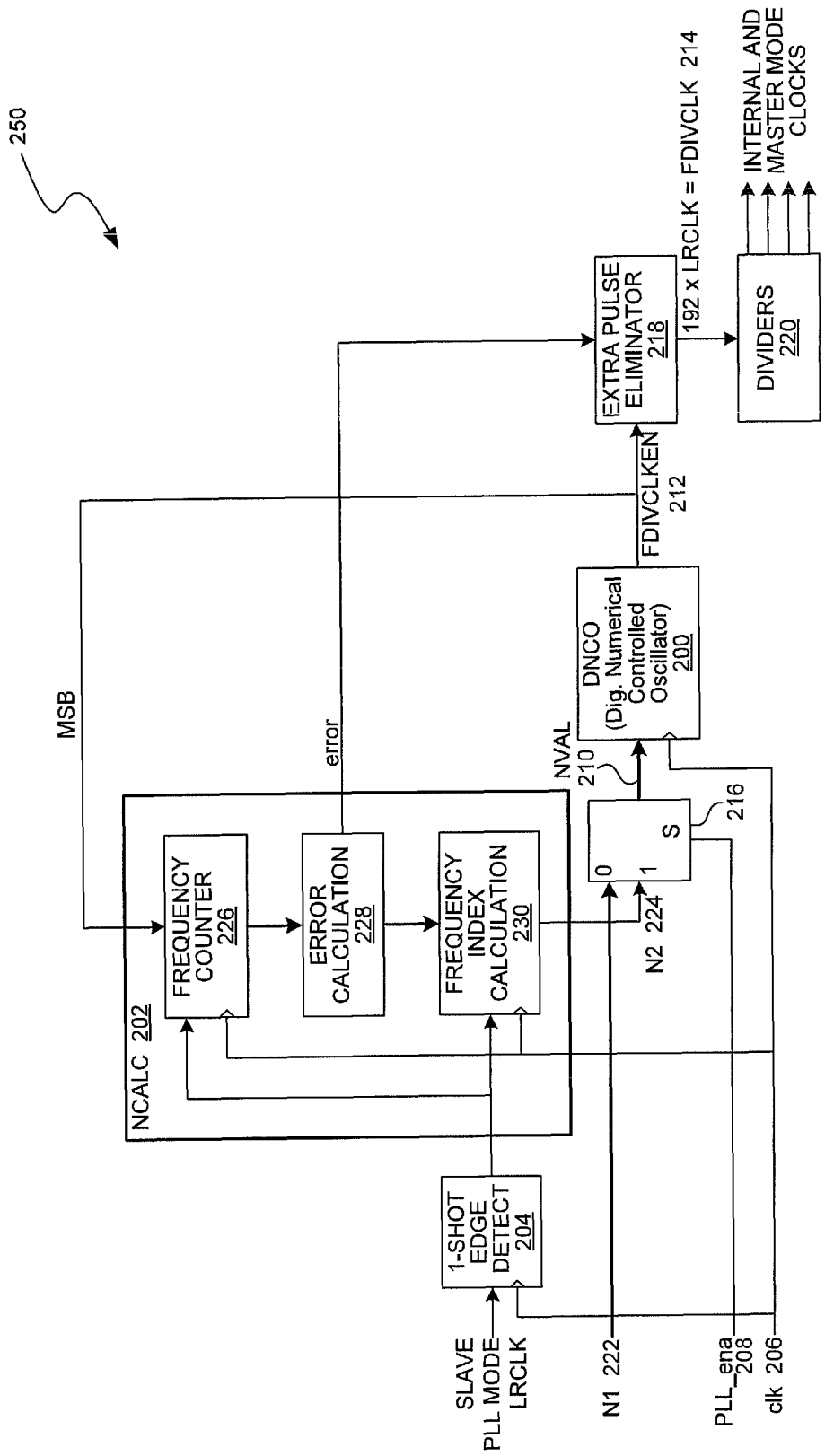
FIG. 2 is a block diagram of a circuit operable in master non-PLL and slave PLL modes to generate a target frequency or multiples of a target frequency from the system clock, according to one embodiment.

FIG. 2 is a block diagram of a circuit 250 operable in either a master non-PLL or slave PLL mode to generate a target frequency or multiples of a target frequency from the system clock 206 having a different frequency, according to one embodiment.

The circuit 250 includes a DNCO 200 which may be a portion of a digital phase locked loop. The DNCO 200 is substantially similar or same in configuration as the DNCO 100 of FIG. 1A. The circuit 250 further includes a two-input multiplexer (MUX) 216 at the DNCO 200 input (e.g., oscillator input), an extra pulse eliminator 218 at the output of the DNCO 200 (e.g., oscillator output), and/or one or more dividers 220. The extra pulse eliminator 218 is coupled at the input to the oscillator output and driven by FDIVCLKEN 212. An enable (bit 1) is generated to be valid from the counts of 0 through 191 and bit 0 is generated as the enable signal for counts that exceed 191 (when generating a 192× clock). The logical AND operation is performed between the enable signal and the FDIVCLKEN signal to perform the extra pulse elimination.

Depending on the target frequency, the FDIVCLKEN 212 is set to count a couple extra states more than the desired target frequency so that large amounts of digitally induced LRCLK jitter may be handled without causing a disruption in operation. For example, if the target frequency FDIVCLK=192*LRCLK, then FDIVCLKEN 212 can be designed to count from 0-192 states, 0-193 states, or 0-194 states, since FDIVCLKEN 212 typically jitters about 193+/−1. In some embodiments FDIVCLKEN 212 can be designed to count to further additional states. Since for FDIVCLK=192*LRCLK, 192 states are needed, FDIVCLKEN 212 is input to the extra pulse eliminator to generate the correct FDIVCLK=192×LRCLK.

In one embodiment, the extra pulse eliminator is used to handle the digital jitter to generate the correct FDIVCLK by removing extra pulses from a frequency that is slightly higher than the desired frequency. Since the generated internal clock signal is slightly higher in frequency than the rate required with the extra pulses need to be eliminated. This enables the circuit to function properly with a highly jittered input LRCLK frequency. The jitter is typically due to the sampling of the signal within the edge detector latch flop, but the signal input may contain additional jitter from other sources as well.

The dividers 220 are coupled to the FDIVCLK 214 to generate any additional internal operation clocks by dividing down FDIVCLK 214 to one or more desired clock rates in the system. When operating in the master non-PLL mode in an audio application, the LRCLK and BCLK (e.g., audio data bit clock input) can be generated from the FDIVCLK signal 214. The dividers 208 can be implemented via any known and/or convenient manner any analog or digital dividers, including but not limited to, regenerative dividers, injection-locked dividers, fractional-N dividers, or digital dividers. In general, the divider configuration depends on the clock rates suitable for DAC filter processing and/or the ADC signal processing.

For the DAC signal path, the filters of one embodiment generally utilize a DSP clock of 96× in the audio mode. In the voice mode, the DSP clock utilized is 192×. The comb filter high frequency rate clock may be 48× whereas the comb filter low frequency rate clock may be 6×. For the ADC signal path, the filters would be suited for a DSP clock of 96× and a modulator clock rate of 64×. The comb filter high frequency rate clock is typically 64× and the comb filter low frequency rate clock can be 4×. Other rates can be selected depending on specific system requirements. For example, additional digital signal processing may be required for a particular application and thus a higher clock rate may be necessitated.

The MUX 216 is controlled by the PLL enable signal (PLL_ena) 208 to select between N1 222 or N2 224 to be the NVAL 210 input to the DNCO 200. Generally, when operating in slave PLL mode, N2 224 is selected (input 1 of the MUX 216) and, in the master non-PLL mode, N1 222 is selected (input 0 of MUX 216). N1 222 represents an NVAL that is user supplied or otherwise externally supplied. In a further embodiment, index values representing commonly used data rates and/or system frequencies and implement a ROM lookup table to obtain the associated NVAL.

In slave PLL mode, additional circuitry (e.g., DPLL circuitry) is used to compute the NVAL 210 during operation. In a non-limiting embodiment, the additional circuit for NVAL computation includes a one-shot edge detector 204 and an N-value calculator (NCALC or N-calculator) 202.

The NCALC 202 may, in one embodiment, include a frequency counter 226, an error calculator 228, and/or a frequency index calculator 230. The circuitry and operation of the one-shot edge detector 204 is illustrated with further reference to FIGS. 3A-B. The circuit configuration of the NCALC 202 is illustrated with further reference to FIG. 4.

Figure 3A:
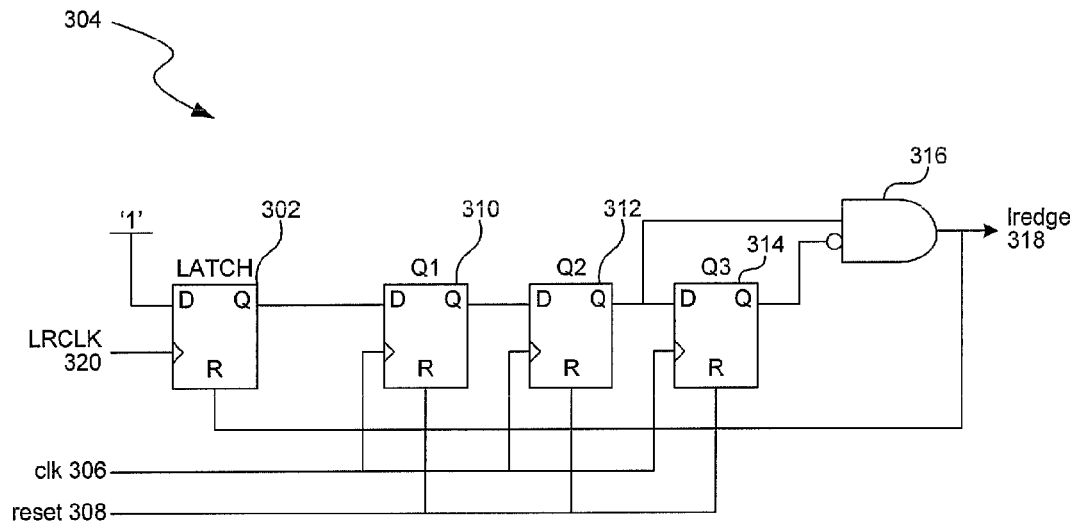
FIG. 3A is a block diagram of a one-shot edge detect circuit, according to one embodiment.

FIG. 3A is a block diagram of a one-shot edge detector circuitry 304, according to one embodiment.

A one-shot edge detector 304 such as the example illustrated is generally used in the slave mode of operation when the NVAL is computed and/or adjusted internally during operation. Thus, the one-shot edge detector is optional in some embodiments.

The one-shot edge detector 304 can be used to generate a signal to indicate when to begin a frequency error measurement sequence to update the NVAL input to a DNCO for generating the FDIVCLKEN signal, for example, as illustrated in the circuit configuration of FIG. 2.

The one-shot edge detector 304, in a non-limiting embodiment, includes a latch 302, a shift register, and a logic gate 316. The latch 302 includes an edge triggered latch output coupled to the input of the shift register. The shift register may include two or more flip-flops, or more particularly, D-flip flops. In one embodiment, the shift register includes three D-flip flops 310, 312, and 314 coupled serially to one another. In one embodiment, the logic gate 316 is an AND gate. The logic gate 316 inverts the output of the flip-flop 314 and performs an AND operation with its input (input of the flip-flop 314) to generate the lredge signal 318. In embodiments with more or less flip-flops, the logic gate 316 performs a logical AND operation on the inverted output and non-inverted input of last flip-flop in the shift-register to generate the lredge signal 318. Other types of logic gates may be used.

Figure 3B:
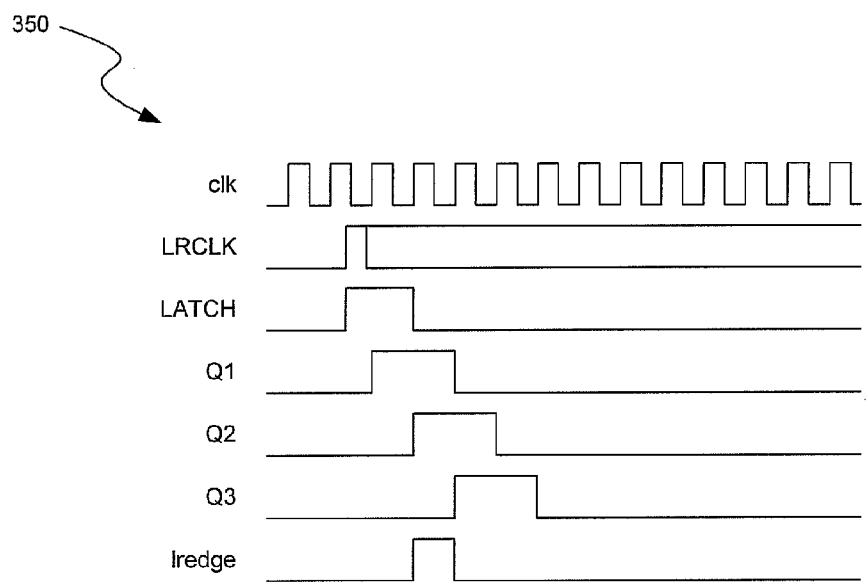
FIG. 3B illustrates the timing diagram of the one-shot edge detect circuit, according to one embodiment.

In particular, for modes of operation when the LRCLK 320 signal may be less than one period of the system clock signal 306 (clk), the latch 302 can be used to capture the rising edge of an LRCLK pulse. FIG. 3B illustrates the timing diagram 350 of the one-shot edge detect circuit 304, according to one embodiment.

The lredge signal 318 is coupled to the latch reset, when, in operation, the lredge signal 318 can reset the latch 302 on reset high, which occurs after the rising edge of LRCLK 320 has been captured.

Figure 4:
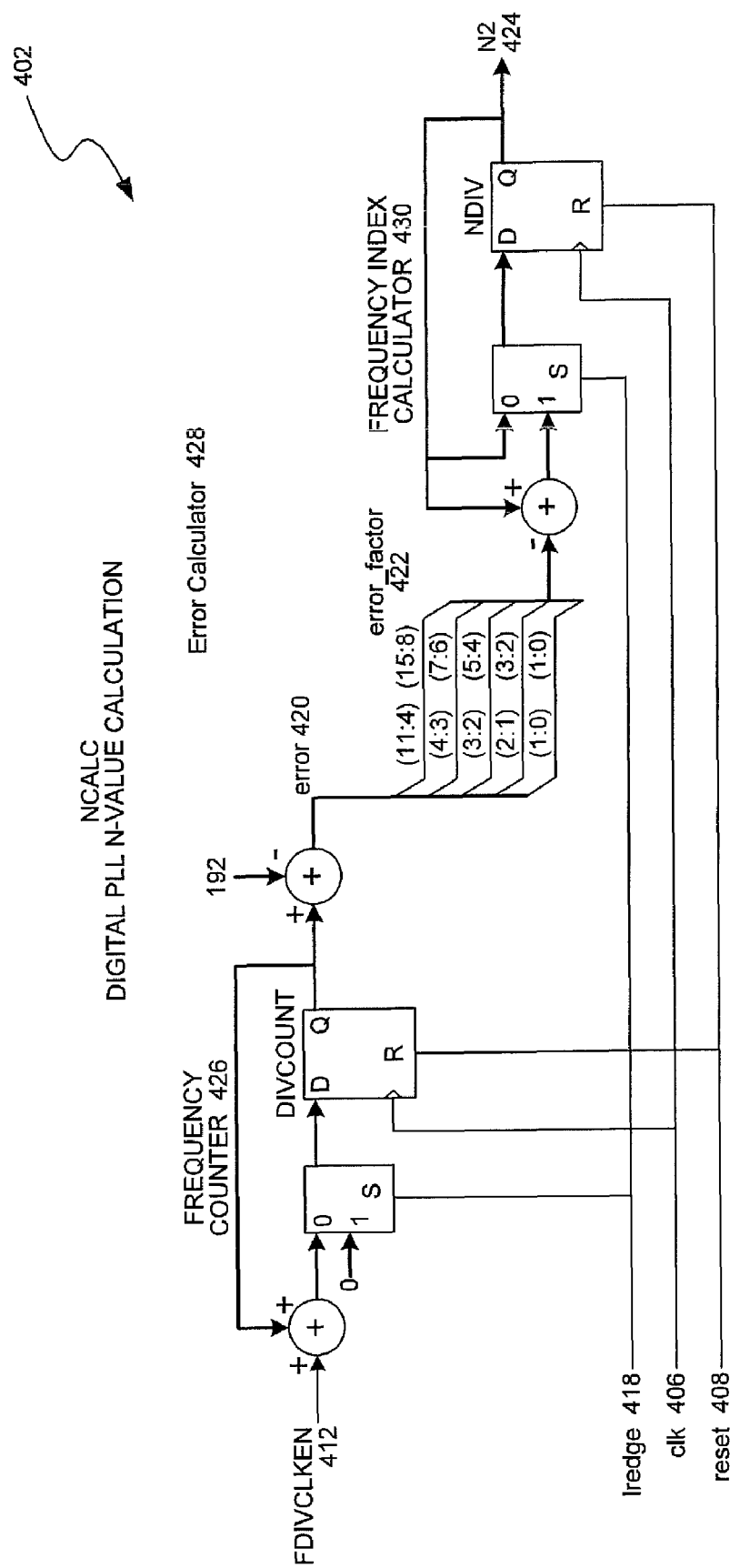
FIG. 4 is a block diagram of an N-calculator comprising a frequency counter module, an error calculator module, and a frequency index calculator, according to one embodiment.

FIG. 4 is a block diagram of an N-calculator 402 comprising a frequency counter module 426, an error calculator module 428, and a frequency index calculator 430, according to one embodiment.

The frequency counter module 426 can count the number of clock periods of its input FDIVCLKEN 412. The frequency counter module 426 initiates the count at the beginning of the LRCLK edge as indicated by the lredge signal 418, for example, the lredge signal as generated from the one-shot edge detect circuitry illustrated in the example of FIG. 3A. When the next LRCLK edge begins, the count is compared with the target frequency value. In a non-limiting example, when the FDIVCLK is designed to be 192×LRCLK, the count is compared with 192. Additional design frequencies are anticipated and are considered to be within the novel aspects of the discussed techniques, including but not limited to, 96×LRCLK, 224×LRCLK, 256×LRCLK, 320×LRCLK, or any other integer multiple of the LRCLK frequency.

In one embodiment, the frequency counter module 426 includes a 2-bit multiplexer and a parallel register with multiple flip flops. The two-to-one MUX has a select input driven by the hedge signal 418 to force the count to zero at the start of every LRCLK period. In the non-limiting example illustrated in FIG. 4, the frequency counter begins counting when the select bit goes to zero, or when the lredge signal 418 is low and stops counting when the select bit is one, or when the lredge signal is high. The result of the frequency count is compared with a predetermined value (e.g., 96, 112, 192, 224, 256, etc.) to generate an error value. In some embodiments, alternate circuit configurations may be employed to count the number FDIVCLKEN 412 pulses in one LRCLK period and are considered to be within the novel aspects of this technique.

The error calculator 428 can be used to reduce the amount of time to obtain a suitable NVAL (N2 424), in particular, when the error value is large. In the example embodiment of the error calculator 428 illustrated in FIG. 4, the error value 420 is magnified using the bit shift technique to obtain an error factor 422 (e.g., coarse mode operation). The adjustment technique further results in small adjustments to NVAL (N2 424) in or near a locked condition (e.g., operating in a trim mode).

The frequency index calculator module 430 continuously updates NVAL (N2 424) based on the comparison between the error factor 422 and the current value of N2 424 at the end of the LRCLK periods. In one embodiment, the calculated N2 424 value is updated at the end of each LRCLK period to provide the NVAL to the DNCO in the next LRCLK period, as shown in FIG. 2. Depending on the bit resolution of NVAL (N2 424), small error corrections may not affect the number of FDIVCLK pulses in an LRCLK period for some time.

Figure 5:
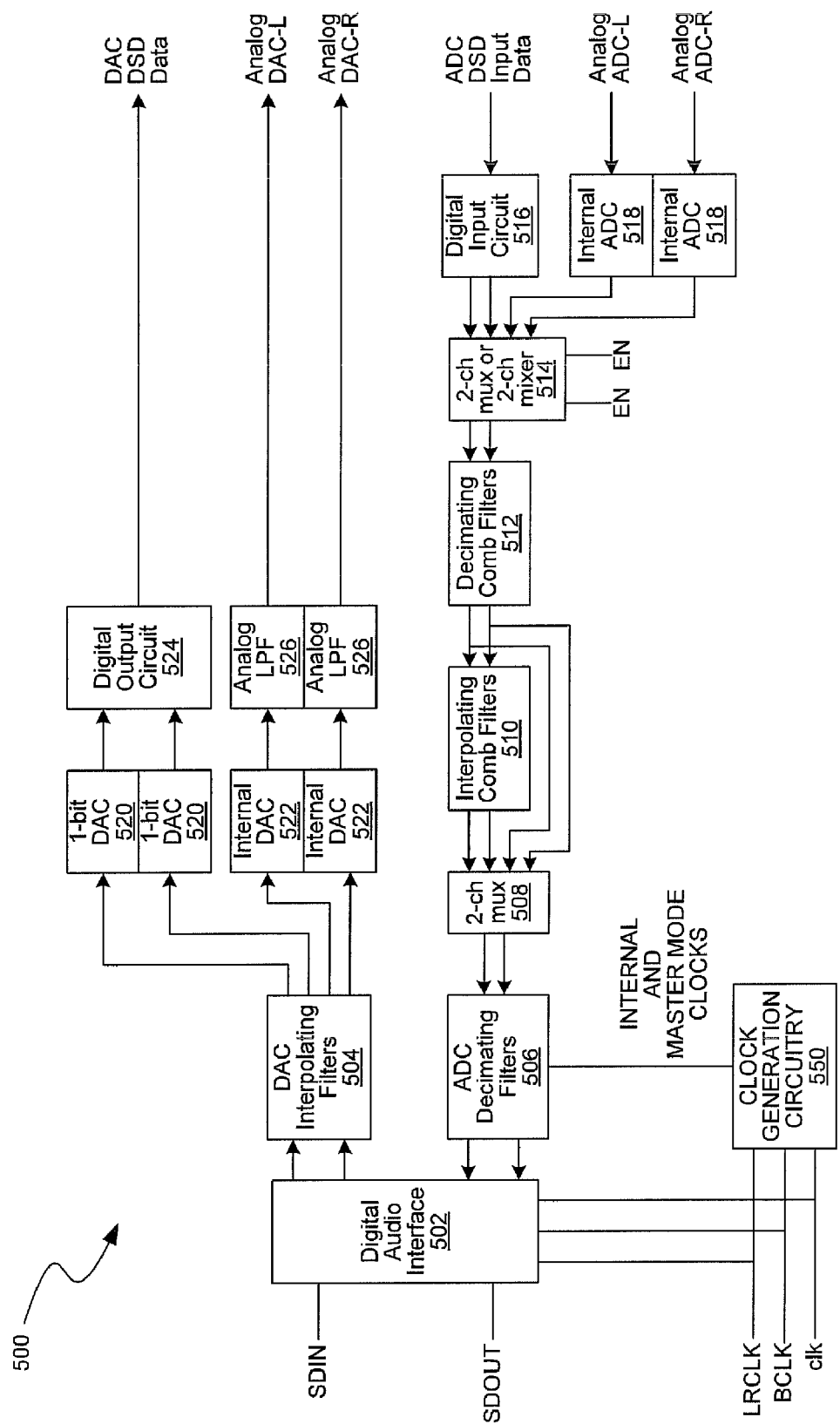
FIG. 5 is a block diagram of a stereo audio codec using clock generation circuitry with a digital phase locked loop and optional asynchronous ADC DSD input data, according to one embodiment.

FIG. 5 is a block diagram of a stereo audio codec 500 using clock generation circuitry 550 with a digital phase locked loop, according to one embodiment.

The stereo audio codec 500 includes a digital audio interface 502, a digital-to-analog conversion (DAC) path, and an analog-to-digital conversion (ADC) path. The clock generation circuitry 550 is substantially the same or similar to the circuit illustrated in FIG. 2 and operates based on substantially the same or similar principles as described with further references to FIGS. 1-4. The input signals to the clock generation circuitry 550 includes the PLL slave mode LRCLK signals, BCLK signals, and the system clock signal. The clock generation circuitry 550 utilizes a digital mechanism (e.g., DNCO or DPLL in the slave mode of operation) to generate signals with a target frequency and integer multiples thereof from a system clock (elk) and an over-sampled data rate (192×LRCLK).

One embodiment of the DAC path includes a DAC interpolating filter 504. The 1-bit DACs 520 and internal DACs 522 in the DAC path may operate at any non-jittered clock frequency. Due to the over-sampling nature of the DACs for digital sample rate conversion, the effects of jitter can be mitigated. In addition, the 1-bit DACs 502 and/or the internal DACs 522 may be implemented using the clock signals (e.g., jittered/over-sampled clock signals) generated from the clock generation circuitry 550, in accordance with embodiments of the disclosure. Generally, the jittered/over-sampled clock signals can be used if the DACs 502 and internal DACs 522 are sampled analog implementations for the smoothing filter as opposed to continuous time circuits. An analog smoothing filter can be implemented with a switched C system to provide filtering before converting to continuous time. In a further embodiment, the feedback of the digital modulator is compensated to include the error introduced within the analog smoothing filter from the jittered clock. For example, if the output is valid for an extra cycle due to jitter, the feedback value of the modulator can be proportionally adjusted.

One embodiment of the ADC path includes an ADC decimating filter 506, a decimating comb filter 512, and/or optionally, an interpolating comb filter 510 when sample rate conversion is required. The filter 510 may be clocked at an additional over-sampled clock rate that is not necessarily related to the input rate of filter 506 to achieve the sample rate conversion in the ADC path The ADC path may further include a first two-channel MUX 508. The first two-channel MUX 508 has output nodes that are coupled serially to the input (the ADC input) of the ADC decimating filter 506 and input nodes coupled to output nodes of the decimating comb filter 512. The input nodes of the first two-channel MUX 508 are also optionally coupled to the output nodes of the interpolating comb filter 510.

The ADC path may also include a second two-channel MUX 514. The MUX 514 has output nodes coupled to the input of the decimating comb filter. The input nodes of MUX 514 may be coupled to internal ADCs 518 that process analog left/right signals and/or additional digital output circuitry 516. The interpolating comb filter 510 is optional under the situation which the inputs or internal ADCs 518 are operated by the clock signals generated by the clock generation circuitry 550. Therefore, the filter 510 can be clocked at an over-sampled clock rate that is not necessarily related to the input rate of decimating filter 506, thus performing the sample rate conversion in the ADC path. The jittered ADC modulator clock's affect on dynamic range is minimal when the modulator is implemented using a switched C rather than a continuous time implementation since the feedback error is sampled in time rather than integrated over time. Additionally, most microphones have a limited dynamic range (about 50 dB) compared to the maximum ideal performance level of the modulator, resulting in only minor levels of perceptible degradation.

In one embodiment, the ADC path includes a mixer (not shown) in lieu of the MUX 514. The mixer may include an adder with each input having its own enable signal. The mixer has, in one embodiment, a first mixer output node and a mixer output node, coupled to the first filter input node and the second filter input node of the decimating comb filter, respectively.

In addition, the ADC decimating filter 506, the decimating comb filter 512, and/or the internal ADCs 518 may be operated with any non jittered clocks. When operated with non-jittered clocks unrelated to the final desired data rate clock that may be jittered, the signals may be first filtered through the decimating comb filter 512 and further up-sampled using the interpolating comb filter 512, for example, at rates that are known relative to the delta-sigma-delta and internal DAC rates. For example, sample rate conversion may be implemented by asynchronously sub-sampling the high rate data streams into the ADC decimating filter 506 which also operates from the over-sample clock generated from the clock generation circuitry 550.

In one embodiment, mixers are used in place of the multiplexers in the ADC path. If the Internal ADC circuitry is clocked with the same synchronous clock as the DSD Input Data rate, then the two stereo inputs can be simply optionally gain adjusted and summed together to mix the signals together if desired. Logical AND gates can be used to enable or disable each input to the mixer. This results in a sharing of the decimating comb filter circuitry when mixing is required.

Figure 6:
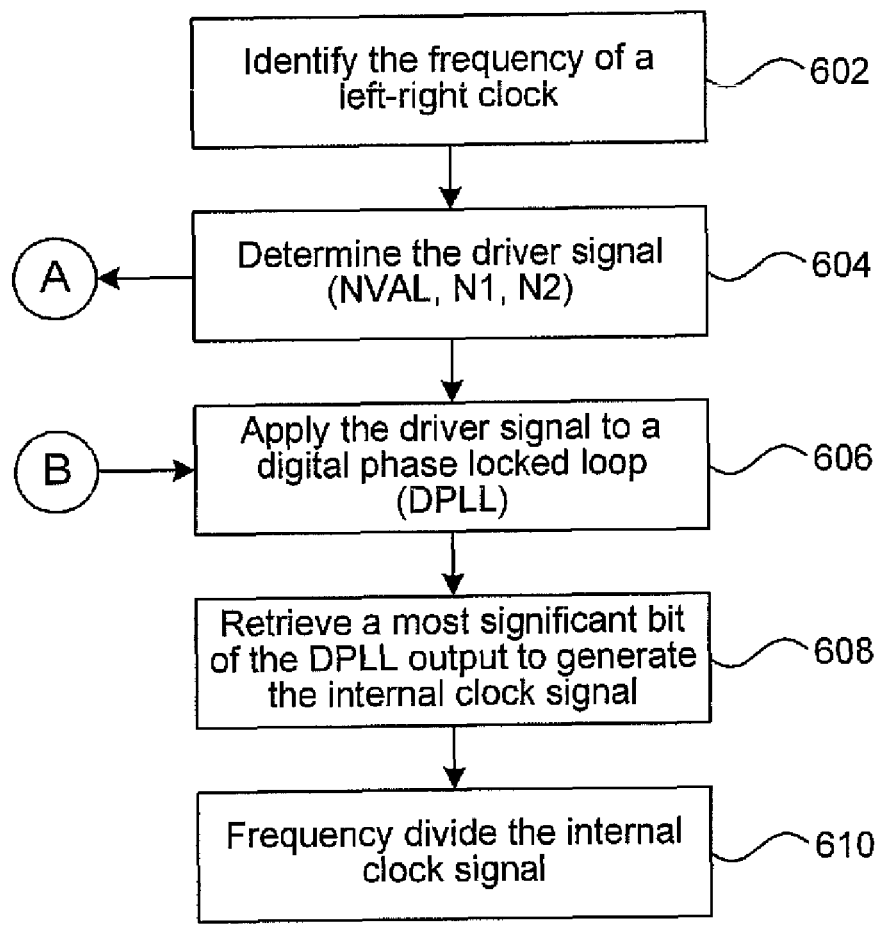
FIG. 6 is an example process flow for generating a target frequency from a system clock, according to one embodiment.

FIG. 6 is an example process flow for generating a target frequency from a system clock, according to one embodiment.

In process 602, the frequency of the left-right clock (LRCLK) is identified. In process 604, the driver signal (NVAL, N1, and N2). The driver signal may be predetermined or computed internally, for example, with further reference to the process of FIG. 7. In process 606, the driver signal is applied to a DNCO. In process 608, a most significant bit of the DNCO output is retrieved to generate the internal clock signal. In process 610, the internal clock signal is frequency divided, for example, to generate additional clock frequencies.

Figure 7:
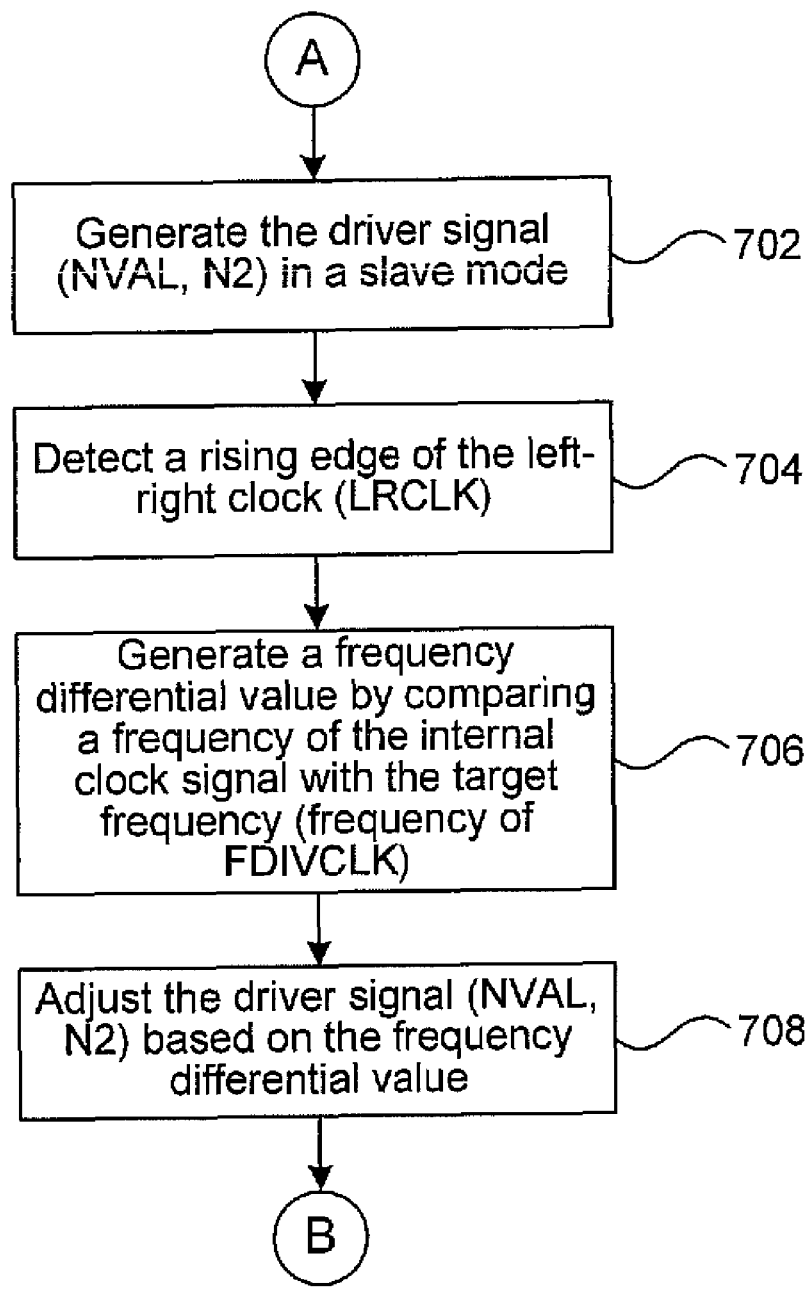
FIG. 7 is an example process flow for determining a driver signal (NVAL) of the DNCO to generate a signal having a target frequency from a system clock having a different frequency, according to one embodiment.

FIG. 7 is an example process flow for generating a driver signal (NVAL) of the DNCO to generate a signal of a target frequency from a system clock, according to one embodiment.

In process 702, the driver signal (NVAL, N2) is to be generated in a slave mode of operation. In process 704, a rising edge of the left-right clock (LRCLK) is detected. In process 706, a frequency differential value is generated by comparing a frequency of the internal clock signal and the target frequency (frequency of FDIVCLK). In process 708, the driver signal (NVAL, N2) is adjusted based on the frequency differential value. Once the driver signal has been adjusted, the signal can be applied to a DPLL for generating the internal clock signal, as illustrated with reference to FIG. 6.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other methods, devices, and/or systems, not necessarily to those described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the device may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated.

In general, the terms used in the following claims should not be construed to limit the disclosure to the specific embodiments disclosed in the specification, unless the above Detailed Description section explicitly defines such twins. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. Accordingly, the inventors reserve the right to add additional claims after filing the application to pursue such additional claim forms for other aspects of the disclosure.

What is claimed is:

1. A circuit for generating a target frequency having an over-sampled data rate using a system clock having a different frequency, the circuit, comprising:
    a digital phase locked loop coupled to the system clock, the digital phase locked loop having an oscillator output and an oscillator input, wherein the digital phase locked loop comprises a digital numerical controlled oscillator comprising,
        a multi-bit integrator having a multi-bit numerical input and a single bit overflow output, when, in operation, the multi-bit integrator is clocked by the system clock, wherein, the multi-bit integrator comprises:
            a multi-bit full adder having an adder output and the multi-bit numerical input; and
            a multi-bit register coupled to the adder output;
    an extra pulse eliminator coupled to the oscillator output, the extra pulse eliminator having an extra pulse eliminator output; and
    one or more frequency dividers coupled to an extra pulse eliminator output.

2. The circuit of claim 1, wherein
the multi-bit register comprises a plurality of flip-flops.

3. A circuit for generating a target frequency having an over-sampled data rate using a system clock having a different frequency, the circuit, comprising:
    a digital phase locked loop coupled to the system clock, the digital phase locked loop comprising a digital numerical controlled oscillator having an oscillator output and an oscillator input;
    an extra pulse eliminator coupled to the oscillator output, the extra pulse eliminator having an extra pulse eliminator output;
    one or more frequency dividers coupled to an extra pulse eliminator output; and
    an N-calculator coupled to the oscillator input,
    wherein the N-calculator comprises:
    a one-shot edge detector comprising a detector output;
    a frequency counter coupled to the detector output, the frequency counter comprising a counter output;
    an error calculator coupled to the counter output, the error calculator comprising a calculator output; and
    a frequency index calculator coupled to the counter output, the frequency index calculator comprising a calculator output coupled to an input of the digital numerical controlled oscillator.

4. The circuit of claim 3, wherein, the one-shot edge detector comprises:
    a latch having an edge triggered latch output and a reset node;

a shift-register comprising at least a first flip-flop coupled in series with a second flip-flop, the second flip-flop having an input node and an output node; and a logic gate having a first input coupled to the input node of the second flip-flop and a second input coupled to the output node of the second flip-flop to detect a rising edge, and the logic gate output coupled to the reset node of the latch.

5. The circuit of claim 4, wherein, the logic gate comprises an AND gate; wherein the second input of the AND gate is inverted.

6. The circuit of claim 4, further comprising, another flip-flop coupled in series between the latch and the first flip-flop, wherein the another flip-flop is coupled to the latch output.

7. The circuit of claim 4, wherein, the first flip-flop is coupled to the latch output.

8. A method for generating an internal clock signal from a system clock, comprising:

identifying a frequency of a left-right clock;

determining a driver signal based on a target frequency of the internal clock signal and an over-sampled data rate determined according to the frequency of the left-right clock;

applying the driver signal to a phase detector of a digital numerical controlled oscillator, the digital numerical controlled oscillator comprises an output; and retrieving a most significant overflow bit of the output to generate the internal clock signal.

9. The method of claim 8, further comprising, frequency dividing the internal clock frequency to generate one or more additional clock frequencies.

10. The method of claim 8, further comprising, generating the driver signal in a slave mode of operation, wherein, the generating comprises:

detecting a rising edge of the left-right clock;

generating a frequency differential value by comparing a frequency of the internal clock signal with the target frequency; and adjusting the driver signal based on the frequency differential value.

11. The method of claim 8, wherein, the driver signal is predetermined.

12. The method of claim 8, wherein, the system clock is substantially within a range of 5 MHz and 25 MHz.

13. The method of claim 12, wherein, the target frequency of the internal clock signal is substantially between 6 kHz to 52 kHz.

14. The method of claim 8, further comprising, operating in a master mode of operation via determining the driver signal based on user input.

15. The method of claim 8, wherein the left-right clock signal is digitally jittered.

* * * * *